United States Patent [19]

Takeshita et al.

[11] Patent Number: 4,466,673
[45] Date of Patent: Aug. 21, 1984

[54] HYDRAULIC BRAKE PRESSURE CONTROL SYSTEM OF VEHICLE LOAD RESPONSIVE TYPE

[75] Inventors: Hiroshi Takeshita, Chiryu; Tsutomu Chuwman; Susumu Yamamoto, both of Toyota, all of Japan

[73] Assignees: Aisin Seiki Kabushiki Kaisha, Kariya; Toyota Jidosha Kogyo Kabushiki Kaisha, Toyota, both of Japan

[21] Appl. No.: 483,852

[22] Filed: Apr. 18, 1983

Related U.S. Application Data

[63] Continuation of Ser. No. 223,214, Jan. 7, 1981, abandoned.

[30] Foreign Application Priority Data

Jan. 16, 1980 [JP] Japan ................... 55-3849

[51] Int. Cl.³ .......................... B60T 8/18; B60T 8/22
[52] U.S. Cl. ..................................... 303/22 R; 188/195
[58] Field of Search .................. 303/22 R, 22 A, 6 C; 188/195, 349; 267/182, 165, 164, 57, 58, 60, 110, 111, 112; 280/703, 714

[56] References Cited

U.S. PATENT DOCUMENTS

| | | | |
|---|---|---|---|
| 3,701,616 | 10/1972 | Kawai | 303/22 R |
| 3,709,568 | 1/1973 | Miyake et al. | 188/195 X |
| 3,762,776 | 10/1973 | Kawabe et al. | 188/195 X |
| 3,773,367 | 11/1973 | Osborne et al. | 303/22 R |
| 3,802,750 | 4/1974 | Kawai | 303/22 R |
| 3,837,713 | 9/1974 | Masuda et al. | 188/195 X |
| 4,060,283 | 11/1977 | Demido et al. | 303/22 R X |
| 4,142,764 | 3/1979 | Kawaguchi | 303/22 R |
| 4,228,991 | 10/1980 | Crosby | 267/111 X |

FOREIGN PATENT DOCUMENTS

| | | | |
|---|---|---|---|
| 2504413 | 8/1975 | Fed. Rep. of Germany | 303/22 R |
| 1167250 | 10/1969 | United Kingdom . | |
| 1252004 | 11/1971 | United Kingdom . | |
| 1306108 | 2/1973 | United Kingdom . | |
| 1337187 | 11/1973 | United Kingdom . | |
| 2068487 | 8/1981 | United Kingdom | 188/195 |

*Primary Examiner*—Douglas C. Butler
*Attorney, Agent, or Firm*—Oblon, Fisher, Spivak, McClelland & Maier

[57] ABSTRACT

In a hydraulic brake pressure control system of the load responsive type for wheeled vehicles, a load sensing member in the form of a leaf spring or a torque bar is engaged with a spring loaded valve piston of a hydraulic brake pressure control valve to exert a biasing force against the valve piston depending upon the wheel load. The load sensing member is formed at its intermediate portion with a plurality of curved portions bent back in a plane perpendicular to the bending action plane of the sensing member. Each intermediate portion defined by the curved portions acts as a torsional element.

10 Claims, 4 Drawing Figures

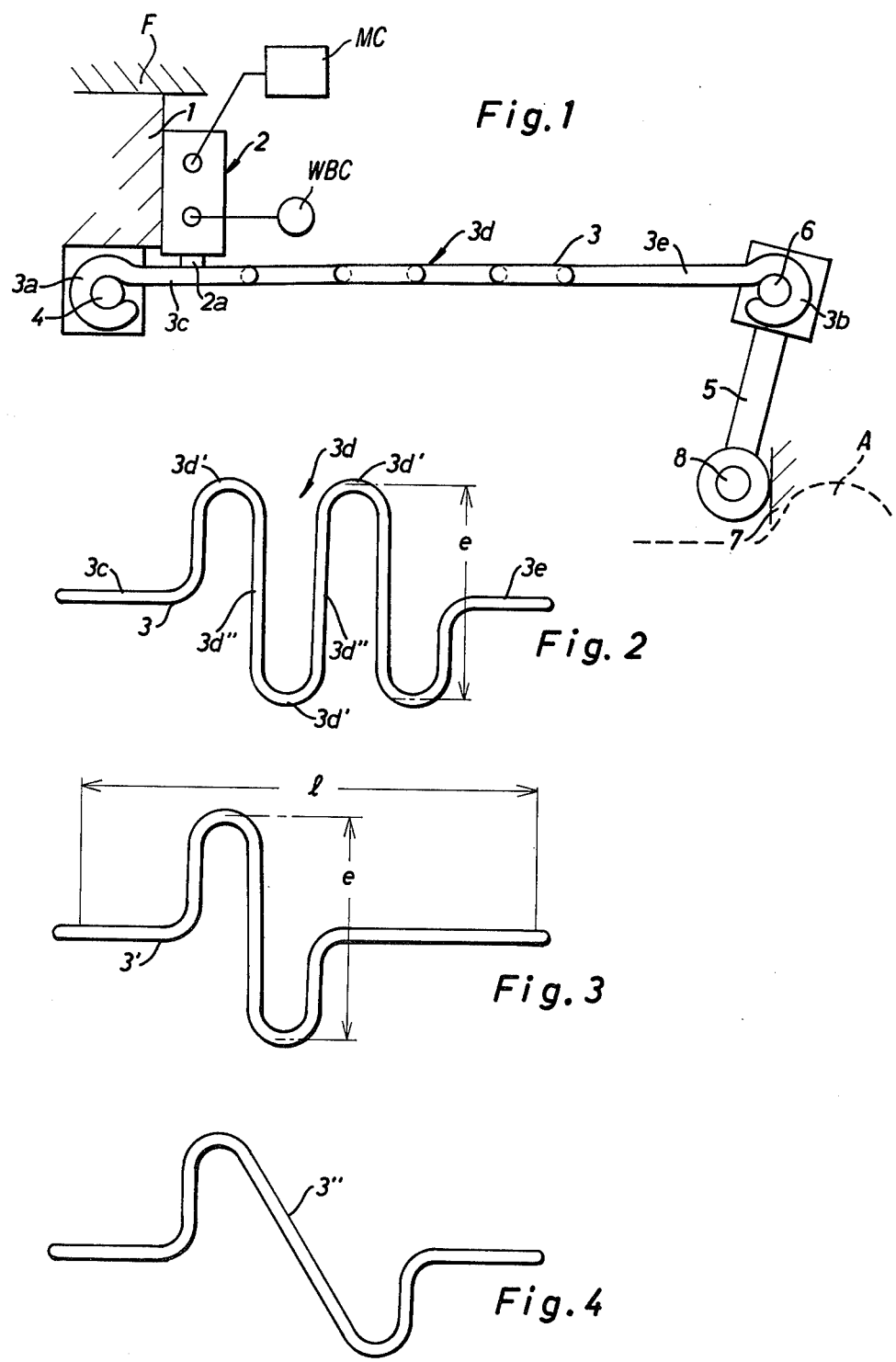

HYDRAULIC BRAKE PRESSURE CONTROL SYSTEM OF VEHICLE LOAD RESPONSIVE TYPE

This application is a continuation of application Ser. No. 223,214, filed Jan. 7, 1981, now abandoned.

BACKGROUND OF THE INVENTION

1. Field of the Invention

The present invention relates to a hydraulic brake pressure control system of the load responsive type for wheeled vehicles, and more particularly to a hydraulic brake pressure control system of the type which is arranged to control the rate of increase of the wheel cylinder pressure less than that of the master cylinder pressure depending upon the wheel load.

2. Description of the Prior Art

A conventional brake pressure control system as described above is well known which includes a hydraulic brake pressure control valve associated with a vehicle load sensing member. The control valve is provided therein with a spring loaded valve piston and is fixedly mounted on either wheel-axle or body frame parts separated from each other by a suspension system. The load sensing member is in the form of a leaf spring or a torque bar which is pivotally connected at its opposite ends to both the wheel-axle and body frame parts and in engagement with the outer end of the valve piston. The leaf spring or torque bar is flexed by relative displacement of the wheel-axle and body frame parts to control a biasing force acting on the valve piston in response to load on the wheels of the axle. In this type of load sensing member, shortening of the leaf spring or torque bar results in an increase of its spring constant. In a case where the mounting space for opposite ends of the leaf spring or torque bar is limited in a short distance, the biasing force on the valve piston excessively changes in response to relative displacement of the two masses separated by the suspension system because of high spring constant of the load sensing member. For this reason, such a load sensing member as a leaf spring or a torque bar may not be adapted to the hydraulic brake pressure control system.

SUMMARY OF THE INVENTION

It is, therefore, a primary object of the present invention to provide an improved load sensing member in the form of a leaf spring or a torque bar mountable in a limited mounting space without any undesired influence to the valve piston of the hydraulic brake pressure control valve.

Another object of the present invention is to provide an improved load sensing member of which spring constant can be adjusted in accordance with the length of the load sensing member.

According to the present invention there is provided a hydraulic brake pressure control system for a wheeled vehicle having wheel-axle and body frame parts separated by a suspension system, and a hydraulic connection between a master cylinder and a wheel brake cylinder, which control system comprises a hydraulic brake pressure control valve secured to one of the parts and incorporated in the hydraulic connection, the control valve being provided therein with a spring loaded valve piston for control of hydraulic pressure applied to the wheel brake cylinder from the master cylinder, and a load sensing member in the form of a leaf spring or a torque bar pivotally mounted at its opposite ends on both the wheel-axle and body frame parts and engaging the valve piston of the control valve to exert a biasing force against the valve piston depending upon load on the wheels of the axle, the spring member being formed at its intermediate portion with at least one curved portion which is bent back in a plane perpendicular to the bending action plane of the spring member to form a pair of torsional portions.

BRIEF DESCRIPTION OF THE DRAWINGS

Additional objects and advantages of the present invention will be more readily apparent from the following detailed description of preferred embodiments thereof when taken together with the accompanying drawings in which:

FIG. 1 is a schematic side view of a hydraulic brake pressure control system for a wheeled vehicle which includes an improved load sensing member in accordance with the present invention;

FIG. 2 is a plan view of the load sensing member of FIG. 1; and

FIGS. 3 and 4 illustrate modifications of the load sensing member.

DETAILED DESCRIPTION OF THE PREFERRED EMBODIMENTS

Referring now to the drawing, FIG. 1 illustrates a conventional hydraulic brake pressure control valve 2 which is secured to a bracket 1 welded to a vehicle body frame F. The control valve 2 is incorporated in a hydraulic connection between a master cylinder MC and a wheel brake cylinder WBC. The control valve 2 is provided therein with a spring loaded valve piston $2a$ which is arranged to control the rate of increase of the wheel cylinder pressure less than that of the master cylinder pressure depending upon the wheel load.

A load sensing member 3 is in the form of a leaf spring or torque bar which is formed in a substantially horizontal plane at its opposite ends with a pair of eyes $3a$ and $3b$ connected to first and second end portions $3c$, $3e$, respectively. The eye $3a$ of member 3 is engaged on a shaft 4 secured to the lower portion of bracket 1, while the eye $3b$ of member 3 is pivotally mounted on a shaft 6 fixed to the upper end of an arm member 5. The arm member 5 is pivoted at its lower end on a shaft 8 which is secured to a bracket 7 welded on the wheel-axle A. Thus, the load sensing member 3 is engaged with the outer end of valve piston $2a$ at a position adjacent to its one end, letting the spring member 3 have a lever effect on the piston $2a$ with its fulcrum at the shaft 4. With this arrangement, the upward or downward movement of bracket 7 corresponds with relative displacement of the wheel-axle and the vehicle body frame caused by different vehicle loads or by the transfer of the center of gravity of the vehicle during braking. This results in the spring member 3 being bent to give different biasing loads on the valve piston $2a$ of control valve 2. As shown in FIG. 1, the ends $3c$ and $3e$ of spring member 3 are mounted on the body frame F and wheel axle A (via eye $3a$ as well as eye $3b$, arm 5 and shaft 8) such that the ends $3c$, $3e$ and a point of engagement of valve piston $2a$ with said spring member 3 lie in a substantially common vertical plane.

As can be well seen in FIG. 2, the spring member 3 is formed at its intermediate portion $3d$ with a plurality of curved portions $3d'$ which are bent back in a substantially horizontal plane perpendicular to the bending action plane of the spring member 3. With this construction, when the spring member end 3b is raised due to an increase of the vehicle load, a bending action occurs respectively at the opposite end portions and curved portions 3d' of spring member 3, and a torsional action occurs respectively at the intermediate portions 3d" in parallel with each other between the curved portions 3d'. As a result of the bending and torsional actions of the spring member 3, the upward displacement of the spring member end 3e relative to the upward load applied thereto increases more than that of a conventional straight spring member. This means that the spring constant of member 3 becomes smaller than that of the conventional straight spring member.

In the actual practice of the present invention, the spring constant of the spring member 3 can be reduced in accordance with the length of its torsional portions. The length of torsional portions can be adjusted by the number of curved portions 3d' and the curved shape and also adjusted by the dimension indicated by the reference numeral e in FIG. 2. For example, a spring member 3' shown in FIG. 3 is modified to reduce the number of its curved portions less than that of the spring member 3, and a spring member 3" shown in FIG. 4 is modified to reduce the number of its curved portions and to change its curved shape.

In an experimental test conducted by the inventors, it has been noted that a spring member 3' of l=350 mm and e=100 mm in FIG. 3 has the same spring constant as that of a conventional straight spring member of l=420 mm, provided that the material and cross-sectional area of the spring member 3' is substantially the same as that of the conventional spring member. It has also been noted that a spring member 3' of l=350 mm and e=300 mm in FIG. 3 has the same spring constant as that of a conventional straight spring member of l=587 mm. In the above embodiments, each of the spring members 3, 3' and 3" has a circular cross-section which may be modified as a rectangular cross-section.

Although certain specific embodiments of the present invention have been shown and described, it is obvious that many modifications thereof are possible. The invention, therefore, is not intended to be restricted to the exact showing of the drawing and description thereof, but is considered to include reasonable and obvious equivalents.

What is claimed is:

1. A hydraulic brake pressure control system for a vehicle having a wheel axle, a master cylinder, a body frame, and a wheel brake cylinder, said hydraulic brake pressure control system comprising:
   (a) a load sensing torque bar in the form of a spring member having a plurality of curved portions formed in an intermediate portion thereof, each of said curved portions forming a torsional portion, said curved portions being disposed in a substantially horizontal plane;
   (b) means for pivotally mounting first and second end portions of said torque bar on the body frame and on the wheel axle of said vehicle, respectively, such that said end portions lie in a common vertical plane; and
   (c) a brake pressure control valve incorporated in a hydraulic connection between the master cylinder and the wheel brake cylinder, said brake pressure control valve having a spring-loaded valve manner upon which said torque bar bears so as to apply to said spring-loaded valve member a force proportional to vehicle load, said spring-loaded valve member lying in said common vertical plane.

2. A hydraulic brake pressure control system as claimed in claim 1, wherein the curved portions of said torque bar are arranged substantially parallel to one another.

3. A hydraulic brake pressure control system as claimed in claim 2, wherein the curved portions of said torque bar are symmetrical about a longitudinal axis of said torque bar.

4. A hydraulic brake pressure control system as claimed in claim 2, wherein said torque bar is circular in cross-section.

5. A hydraulic brake pressure control system as claimed in claim 2, further comprising a bracket connected to the wheel axle of said vehicle and a bracket which carries said brake pressure control valve on the body frame of said vehicle, and wherein the first end portion of said torque bar is pivotally mounted on said bracket which carries said brake pressure control valve and the second end portion of said torque bar is pivotally operatively associated with said bracket connected to the wheel axle, said torque bar engaging the spring-loaded valve member of said brake pressure control valve at a position adjacent the first end portion of said torque bar.

6. A hydraulic brake pressure control system as claimed in claim 1, wherein the curved portions of said torque bar are symmetrical.

7. A hydraulic brake pressure control system as claimed in claim 6, wherein said torque bar is circular in cross-section.

8. A hydraulic brake pressure control system as claimed in claim 6, further comprising a bracket connected to the wheel axle of said vehicle and a bracket which carries said brake pressure control valve on the body frame of said vehicle, and wherein the first end portion of said torque bar is pivotally mounted on said bracket which carries said brake pressure control valve and the second end portion of said torque bar is pivotally operatively associated with said bracket connected to the wheel axle, said torque bar engaging the spring-loaded valve member of said brake pressure control valve at a position adjacent the first end portion of said torque bar.

9. A hydraulic brake pressure control system as claimed in claim 1, wherein said torque bar is circular in cross-section.

10. A hydraulic brake pressure control system as claimed in claim 1, further comprising a bracket connected to the wheel axle of said vehicle and a bracket which carries said brake pressure control valve on the body frame of said vehicle, and wherein the first end portion of said torque bar is pivotally mounted on said bracket which carries said brake pressure control valve and the second end portion of said torque bar is pivotally operatively associated with said bracket connected to the wheel axle, said torque bar engaging the spring-loaded valve member of said brake pressure control valve at a position adjacent the first end portion of said torque bar.

* * * * *